(12) United States Patent
Dodd

(10) Patent No.: US 6,475,560 B2
(45) Date of Patent: Nov. 5, 2002

(54) SELF-CLEANING SPRAY CHAMBER FOR LIVESTOCK AND POULTRY FEED PELLET PROCESSING SYSTEM

(75) Inventor: James W. Dodd, Alpharetta, GA (US)

(73) Assignee: AGR International, Inc., Roswell, GA (US)

( * ) Notice: Subject to any disclaimer, the term of this patent is extended or adjusted under 35 U.S.C. 154(b) by 0 days.

(21) Appl. No.: 09/965,356

(22) Filed: Sep. 27, 2001

(65) Prior Publication Data

US 2002/0009543 A1 Jan. 24, 2002

Related U.S. Application Data

(62) Division of application No. 09/487,009, filed on Jan. 19, 2000, now Pat. No. 6,331,210.
(60) Provisional application No. 60/116,601, filed on Jan. 20, 1999.
(51) Int. Cl.[7] .................................................. B05D 7/00
(52) U.S. Cl. ........................ 427/212; 427/424; 118/303
(58) Field of Search ................................. 427/212, 421, 427/424; 118/303, 24, 19, 23, 320, 447, 70

(56) References Cited

U.S. PATENT DOCUMENTS 2,862,511 A * 12/1958 Forsberg ..................... 118/303

* cited by examiner

*Primary Examiner*—Michael Barr
*Assistant Examiner*—Rebecca Blanton
(74) *Attorney, Agent, or Firm*—Morris, Manning & Martin, LLP

(57) ABSTRACT

Using a self-cleaning spray chamber for feed pellets including a dry mass flow meter operatively coupled to a hopper for feed pellet flow and a spray chamber. The spray chamber is configured so that the pellet flow leaving the dry mass flow meter strikes the side wall of the spray chamber that opposes the nozzles located within the spray chamber, thereby causing the pellets to frictionally clean the chamber side wall. This cleaning action substantially reduces the need for manually cleaning the spray chamber as the flow of pellets through the spray chamber removes the liquid additive and assists in the coating of the pellets within the spray chamber. The flow meter provides a wide, relatively thin ribbon of pellets to the wall of the spray chamber that opposes the nozzles. This provides a more even distribution of pellets for coating and better protects the sidewall from overspray coating.

17 Claims, 3 Drawing Sheets

Figure 1:
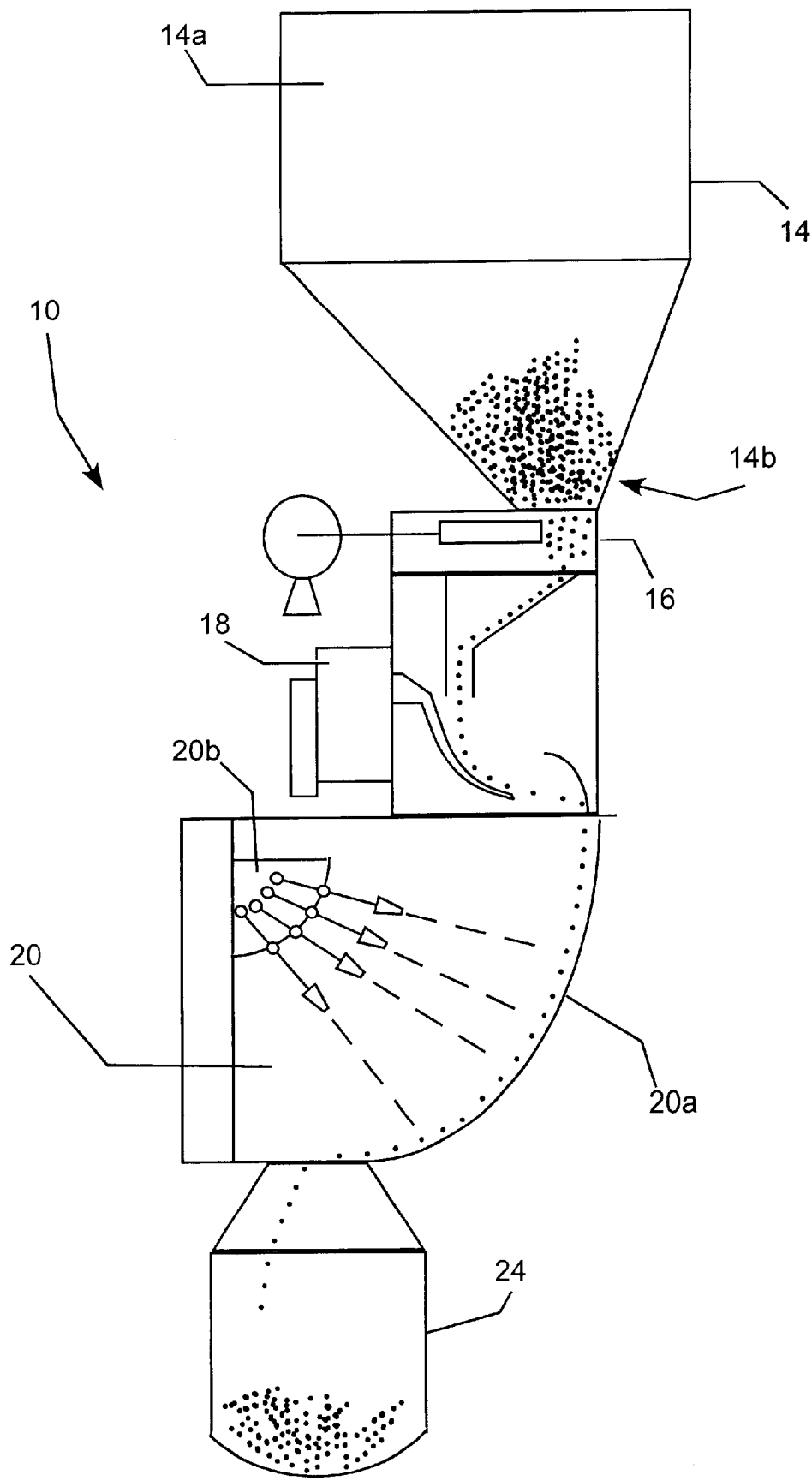

SELF-CLEANING SPRAY CHAMBER FOR LIVESTOCK AND POULTRY FEED PELLET PROCESSING SYSTEM

REFERENCE TO RELATED APPLICATION

This application is a Divisional of application Ser. No. 09/487,009 filed Jan. 19, 2000, which claims priority under 35 U.S.C. §119 U.S. Provisional Application Serial No. 60/116,601 filed Jan. 20, 1999.

FIELD OF THE INVENTION

This invention relates to a system for processing feed pellets for poultry and livestock, and more particularly, to spray chambers for coating feed pellets during processing.

BACKGROUND OF THE INVENTION

Processing systems for manufacturing feed pellets for poultry and livestock are well known. Of increasing importance within this industry is the usage of liquid additives. These additives include amino acids, vitamins, flavors, mold inhibitors, pellet binders, antioxidants, drugs and enzymes. In some pellet processing systems, these liquid additives are applied as a coating to finished pellets prior to directing the pellet stream to a bin for storage. Typically, the pellets are provided either by gravity feed or motorized conveyor to a control gate which selectively opens to drop pellets through a spray chamber. The spray chamber is a volumetric structure typically having nozzles mounted along at least one wall of the spray chamber. These nozzles are coupled to pumps that provide liquid additives from a reservoir to the nozzles so the liquid additives are dispensed under pressure from the nozzles to coat the pellets as they fall through the spray chamber. The coated pellets typically fall into a hopper that has a motor-driven auger mounted at its lowest end for transporting the coated pellets to a conveyor belt for routing to storage bins.

One of the problems with these types of systems is the need to periodically shut down the processing equipment and clean the spray chamber. The cleaning of the spray chamber is required because liquid additives, which miss pellets in the stream as they fall through the spray chamber, adhere to the wall opposing the nozzles of the spray chamber. Of course, the down-time associated with the cleaning of the spray chamber impacts the utilization of the pellet processing system and its economic efficiency. To extend the time between spray chamber cleanings, nozzles are typically placed at an angle on the high side of the spray chamber to reduce the likelihood that the spray has sufficient energy to reach the opposing wall if it passes through the pellet stream without contacting one or more pellets in the stream. A typically rule of thumb for placement of nozzles is the use of one nozzle for each two to three feet of spray chamber length. While careful placement of the nozzles somewhat increases the time between spray chamber cleanings, these cleanings are still required on a regular basis.

What is needed is a system that substantially reduces the need for spray chamber cleanings in a feed pellet processing system.

SUMMARY OF THE INVENTION

The above-limitations of previously known feed pellet processing systems are overcome by the dry mass flow meter/spray chamber combination of the present invention. The system of the present invention includes a dry mass flow meter operatively coupled to a hopper for livestock and poultry feed pellet flow and a spray chamber mounted proximate to the outlet of the dry mass flow meter so the pellets strike the side wall of the spray chamber that oppose the nozzles of the spray chamber at a position where spray that misses the pellets in the pellet stream impinge on the spray chamber side wall. That is, the spray chamber is located so the pellet flow leaving the dry mass flow meter strikes the side wall of the spray chamber that opposes the nozzles located within the spray chamber so the pellets frictionally clean the chamber side wall of liquid additives emitted from the nozzles. In this manner, the cleaning action of the pellets substantially reduces the need for cleaning the spray chamber as the flow of pellets through the spray chamber removes the liquid additive and assists in the coating of the pellets within the spray chamber. The dry mass flow meter of the present invention provides a wide, relatively thin ribbon of pellets to be presented close to the wall of the spray chamber that opposes the nozzles to provide a more even distribution of the pellets for coating and to better protect the side wall from overspray coating.

The system of the present invention incorporates the cleaning capability of pellet flow that has previously been ignored in other feed processing systems. In other systems, pellet flow was not placed proximate to the opposing side wall as prior systems placed the flow of pellets closer to the center of the spray chamber to reduce the likelihood that overspray would reach the opposing side wall and coat the wall. The present invention is counter to that principle and utilizes the pellet stream itself to provide cleaning action for the spray chamber and substantially increase the time between spray chamber cleanings, if necessary at all.

These and other advantages and benefits of the present invention may be ascertained from the detailed description of the invention in the accompanying drawings.

BRIEF DESCRIPTION OF THE DRAWINGS

The accompanying drawings, which are incorporated and, constitute a part of the specification, illustrate a preferred embodiment of the present invention and, together with a general description given above and the detailed description given below, serve to explain the principles of the present invention.

FIG. 1 is a depiction of the components in the system of the present invention; and FIG. 2 is a depiction of the components of the, liquid feed additive system of the present invention.

FIG. 3 is a block diagram of a control system for the liquid feed additive system of the present invention.

DETAILED DESCRIPTION OF THE INVENTION

System 10 is comprised of a retention hopper 14, a flow control gate 16, a dry mass flow meter 18, and a spray chamber 20. Retention hopper 14 is a generally conical shaped volumetric structure for receiving dry pellets from a pellet processing line. The pellets are typically fed in a gravity flow to inlet 14*a* of hopper 14. Flow control gate 16 is mounted at the outlet end of 14*b* of hopper 14. Flow control gate 16 is used to block the flow of pellets to prevent the downstream migration of pellets if spray chamber 20 or some other downstream component is not operational in the system. Such flow control gates for retention hoppers are well known in the industry. Coupled to the downstream side of flow control gate 16 is a dry mass flow meter 18 which is preferably one manufactured by Eastern Instruments of Wilmington, N.C. under the trademark THE CENTRI-FLOW. Dry mass flow meter 18 measures the mass of the dry material stream passing through meter 18. The data regarding the flow rate (mass/unit of time) of dry material through dry mass flow meter 18 is provided to a computer control system 50 (shown on FIG. 3) which regulates the flow of liquid additives through the additive system (shown on FIG. 2) to the nozzles mounted in spray chamber 20. Dry mass flow meter 18 converts the stream of pellets as they fall through control gate 16 into a broad relatively thin stream of pellets and adds an outward component to their force as they are expelled from dry mass flow meter 18.

The outward component of the force of the dry pellets causes the pellets to strike side wall 20a of spray chamber 20 and the pellets fall along side wall 20a towards a mixing screw 24 located at the outlet end of spray chamber 20. Mounted along side wall 20b of spray chamber 20 are nozzles for the expulsion of liquid feed additives. The nozzles are directed toward side wall 20a to coat the feed pellets as they fall along side wall 20a. Mixing screw 24 is driven by a motor (not shown) to carry the freshly coated pellets away from spray chamber 20 to a conveyor belt or a gravity feed mechanism for delivery to storage bins.

In system 10 shown in FIG. 1, the stream of feed pellets impinge on side wall 20a and fall along side wall 20a. Preferably, side wall 20a of spray chamber 20 is canted toward side wall 20b. This structure causes the pellets to cascade along side wall 20a to receive the liquid feed additive being sprayed from the nozzles mounted in side wall 20b and promotes the frictional action of the pellets against side wall 20a. In this manner, additives sprayed from the nozzles which travel to side wall 20a are absorbed by pellets as they cascade down side wall 20a. Thus, dry mass meter 18 directs the stream of feed pellets against chamber side wall 20a to clean the wall and modifies the shape of the stream to promote the coating of the food pellets.

Figure 2:
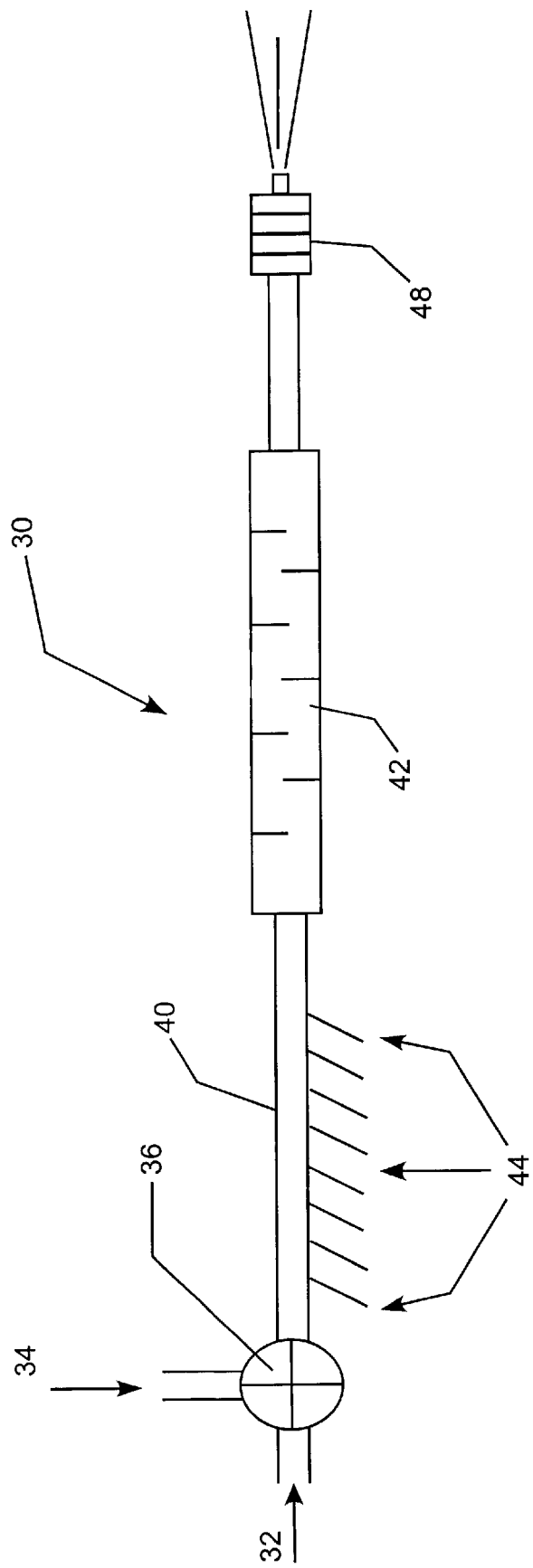
Figure 3:
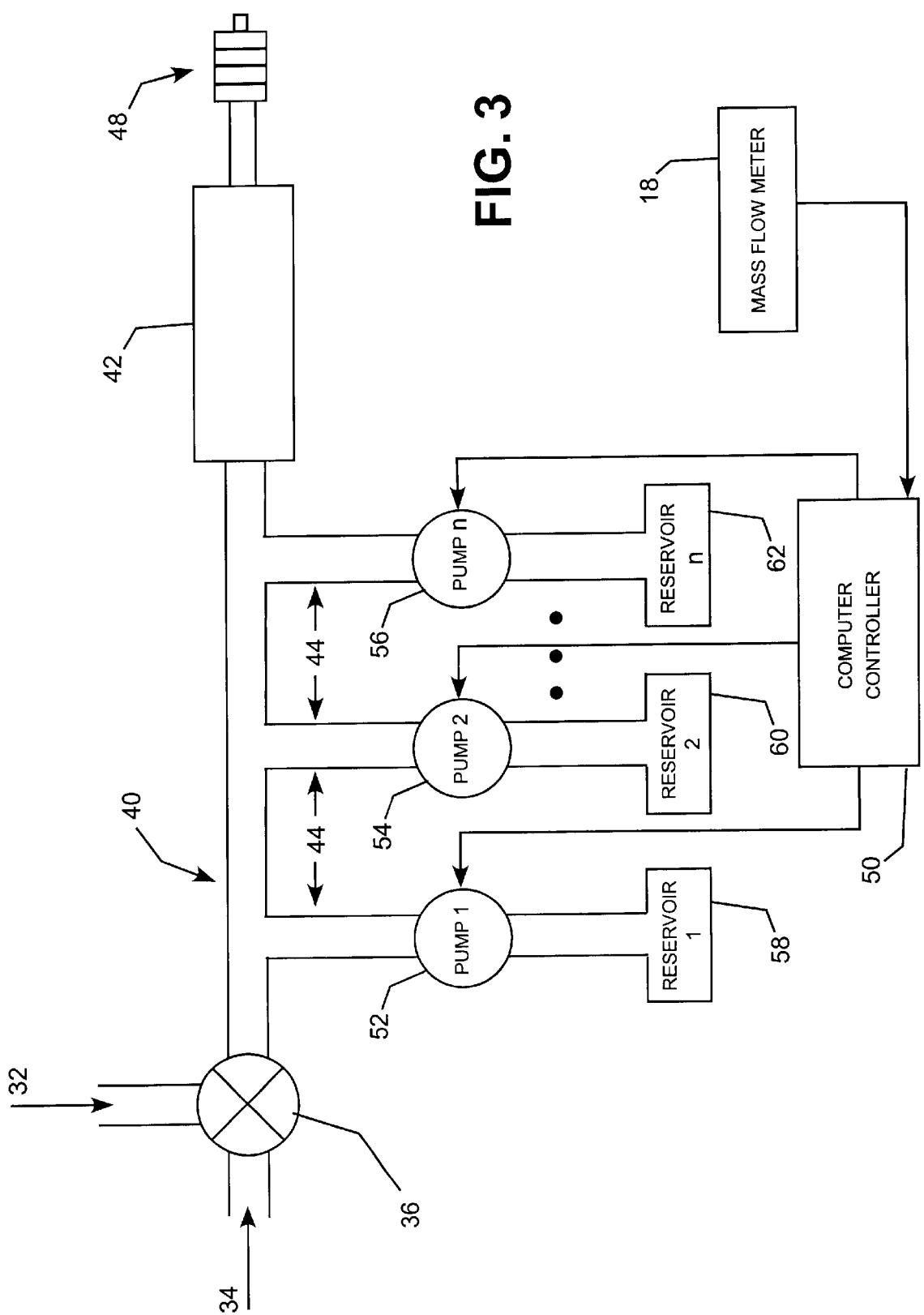

Additive system 30 of the present invention is shown in FIG. 2, and a control system for the additives system is shown on FIG. 3. System 30 includes a water dilution line 32 and air purge line 34 that are coupled to a three-way valve 36. Three way valve 36 may be used to block the flow of both lines so only additives flow in system 30, to couple water line 32 to the additives for dilution, or to couple an air source to system 30 to purge the system of liquid. Injector ports 44 extend from conduit 40 between static mixer 42 and three-way valve 36. Injection ports 44 are coupled to reservoirs 58–62 (shown on FIG. 3) of feed additives. Pumps 52–56 (shown on FIG. 3) provide the feed additives from the reservoirs to the injection ports at a rate controlled by the computer 50, which receives the dry mass flow rate data from dry mass flow meter 18. Static mixer 42 enhances the combining of the feed additives with water from dilution line 32. The flow of liquid from static mixer 42 is conducted to one or more spray nozzles 48 that are mounted within side wall 20b of spray chamber 20 as noted above.

Dry mass flow meter 18 of the present invention provides accurate dry mass flow rate data for the control of additive delivery to pellet processing system. The placement of spray chamber 20 so the pellet flow outwardly deflected by dry mass flow meter 18 is directed toward side wall 20a enhances cleaning of side wall 20a by the frictional action of the cascading flow of pellets within spray chamber 20. This unique combination of elements to provide more accurate control of the liquid additive flow and the cleaning of spray chamber 20 is previously unknown.

While the present invention has been illustrated by the description of the preferred embodiment and while the embodiment has been described in considerable detail, it is not the intention of the applicants to restrict or anyway limit the scope of the invention to such detail. Additional advantages and modifications will readily appear to those skilled in the art. The invention's broader aspects are therefore not limited to the specific details, representative apparatus and method, or the illustrative example shown and described. Accordingly, departures may be made from such details without departing from the spirit or scope of applicant's general inventive concepts.

The invention claimed is:

1. A method for coating feed pellets with a liquid additive comprising:
    directing a flow of feed pellets onto a canted side wall of a spray chamber, the canted side wall opposing at least one spray nozzle configured for directing a spray stream of at least one liquid additive toward the side wall, the canted side wall configured for receiving the flow of pellets such that the pellet flow frictionally travels along the wall towards a discharge end; and
    spraying a stream of liquid additive at the flow of pellets while traveling along the canted wall side from the at least one spray nozzle.

2. The method of claim 1 wherein a mass flow meter is configured for directing the flow of feed pellets onto the canted side wall.

3. The method of claim 1 wherein a mass flow meter is configured for directing the flow of feed pellets onto the canted side wall at a predetermined location.

4. The method of claim 3 wherein the predetermined location is a point along the flow of pellets before a location where the stream of additives impinges the flow of pellets.

5. The method of claim 1 wherein the flow of feed pellets is a ribbon of pellets.

6. The method of claim 5 wherein the ribbon is only one pellet deep such that each pellet is coated with liquid additive.

7. A method for coating feed pellets with a liquid additive comprising:
    supplying a flow of feed pellets through a flow control gate configured for regulating the pellet flow based on an input signal;
    receiving the flow of pellets with a dry mass flow meter configured for generating an output signal representing the rate of flow of the pellets;
    directing a flow of feed pellets onto a canted side wall of a spray chamber, the side wall opposing at least one spray nozzle configured for directing a spray stream of at least one liquid additive toward the side wall, the side wall configured for receiving the flow of pellets such that the pellet flow frictionally travels along the side wall towards a discharge end;
    spraying a stream of liquid additive at the flow of pellets from the at least one spray nozzle; and
    using the output signal from the dry mass flow meter for regulating the flow of the pellets and for regulating the amount of liquid additive sprayed from the at least one spray nozzle.

8. The method of claim 7 wherein the mass flow meter is configured for directing the flow of feed pellets onto the canted side wall.

9. The method of claim 7 wherein the mass flow meter is configured for directing the flow of feed pellets onto the canted side wall at a predetermined location.

10. The method of claim 9 wherein the predetermined location is a point along the flow of pellets before a location where the stream of additives impinges the flow of pellets.

11. The method of claim 7 wherein the flow of feed pellets is a ribbon of pellets.

12. The method of claim 11 wherein the ribbon is only one pellet deep such that each pellet is coated with liquid additive sprayed from the at least on spray nozzle.

13. A method for coating feed pellets with a liquid additive comprising:
   supplying a flow of feed pellets through a flow control gate configured for regulating the flow of pellets;
   receiving the flow of pellets with a dry mass flow meter;
   directing the flow of feed pellets from the flow meter onto a canted side wall of a spray chamber, the side wall opposing at least one spray nozzle configured for directing a spray stream of at least one liquid additive toward the side wall, the side wall configured for receiving the flow of pellets such that the flow of pellets frictionally travels along the wall towards a discharge end; and
   spraying a stream of liquid additive at the flow of pellets from the at least one spray nozzle.

14. The method of claim 13 wherein the flow control gate is configured for regulating the flow of pellets based on a signal input to the flow control gate.

15. The method of claim 13 wherein the dry mass flow meter is configured for generating a signal output representing the rate of flow of pellets received from the flow control gate.

16. The method of claim 15 wherein the signal output from the dry mass flow meter is used for regulating the flow of pellets, the flow control gate being configured for regulating the flow of pellets based on a signal input to the flow control gate received from the dry mass flow meter.

17. The method of claim 15 wherein the signal output from the dry mass flow meter is used for regulating the amount of liquid additive sprayed at the flow of pellets from the at least one spray nozzle.

* * * * *